(12) United States Patent
Morival et al.

(10) Patent No.: US 11,691,458 B2
(45) Date of Patent: Jul. 4, 2023

(54) TIRE COMPRISING A TREAD HAVING GROOVES WITH UNDERCUT SIDE FACES AND REINFORCING ELEMENTS

(71) Applicant: COMPAGNIE GENERALE DES ETABLISSEMENTS MICHELIN, Clermont-Ferrand (FR)

(72) Inventors: Sylvain Morival, Clermont-Ferrand (FR); Frédéric Perrin, Clermont-Ferrand (FR); Patrick Pallot, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 113 days.

(21) Appl. No.: 16/495,969

(22) PCT Filed: Mar. 19, 2018

(86) PCT No.: PCT/FR2018/050656
§ 371 (c)(1),
(2) Date: Sep. 20, 2019

(87) PCT Pub. No.: WO2018/172680
PCT Pub. Date: Sep. 27, 2018

(65) Prior Publication Data
US 2020/0130417 A1    Apr. 30, 2020

(30) Foreign Application Priority Data
Mar. 20, 2017  (FR) .......................... 1752256

(51) Int. Cl.
*B60C 11/00* (2006.01)
*B60C 11/13* (2006.01)
(Continued)

(52) U.S. Cl.
CPC ...... *B60C 11/0041* (2013.01); *B60C 11/0008* (2013.01); *B60C 11/0058* (2013.01);
(Continued)

(58) Field of Classification Search
CPC ............. B60C 11/0041; B60C 11/0058; B60C 11/1307; B60C 11/1346; B60C 2011/0025
See application file for complete search history.

(56) References Cited

U.S. PATENT DOCUMENTS 9,862,233 B2   1/2018   Bechon et al.
9,962,996 B2   5/2018   Abad et al.
(Continued)

FOREIGN PATENT DOCUMENTS

FR       3035616 A1       11/2016
JP    2010-047072 A  *    3/2010
(Continued)

OTHER PUBLICATIONS

Machine translation for WO 2018/002488 (Year: 2021).*
(Continued)

*Primary Examiner* — Steven D Maki
(74) *Attorney, Agent, or Firm* — Venable LLP

(57) ABSTRACT

A tire has a tread 5 which includes grooves 7, the side faces 72 of which are undercut, and includes at least one circumferential reinforcing element 8-1 arranged axially relative to said undercut side face 72 at a distance "d" of between 0 and 15% of the axial width L51 of the tread block 51, at least extending radially from the inside towards the outside from a radial level situated above the wear limit level and to a radial height equal to 5% of the thickness "p" of the tread.

9 Claims, 15 Drawing Sheets

(52) U.S. Cl.
CPC .......... *B60C 11/13* (2013.01); *B60C 11/1307* (2013.01); *B60C 11/1346* (2013.01); *B60C 2011/0025* (2013.01)

(56) References Cited

U.S. PATENT DOCUMENTS

| | | | |
|---|---|---|---|
| 2007/0187013 A1* | 8/2007 | Losi | B60C 11/18 156/111 |
| 2008/0105353 A1* | 5/2008 | Losi | B29D 30/60 152/537 |
| 2013/0213542 A1* | 8/2013 | Warfford | B60C 11/0327 152/209.18 |
| 2013/0340905 A1 | 12/2013 | Bechon et al. | |
| 2014/0069560 A1* | 3/2014 | Schweitzer | C08L 15/00 523/156 |
| 2015/0336431 A1* | 11/2015 | Kaneko | B60C 11/11 152/209.24 |
| 2016/0229229 A1 | 8/2016 | Pallot et al. | |
| 2018/0117972 A1 | 5/2018 | Perrin et al. | |
| 2018/0186189 A1* | 7/2018 | Pallot | B60C 11/0075 |
| 2018/0304693 A1 | 10/2018 | Pallot et al. | |
| 2019/0255887 A1* | 8/2019 | Perrin | B60C 9/18 |

FOREIGN PATENT DOCUMENTS

| | | |
|---|---|---|
| JP | 2013-220780 A * | 10/2013 |
| WO | 2012/069603 A1 | 5/2012 |
| WO | 2015/036175 A1 | 3/2015 |
| WO | 2016/174100 A1 | 11/2016 |
| WO | 2016/202703 A1 | 12/2016 |
| WO | WO-2016/202702 A1 * | 12/2016 |
| WO | WO-2018/002488 A1 * | 1/2018 |

OTHER PUBLICATIONS

Machine translation for WO 2016/202702 (Year: 2021).*
Machine translation for Japan 2013-220780 (Year: 2022).*
Machine translation for Japan 2010-047072 (Year: 2022).*
Garratt, Shore Durometer History, shore-durometer-history.blogspot.com/, six pages, Jan. 11, 2013 (Year: 2013).*
International Search Report dated Jun. 11, 2018, in corresponding PCT/FR2018/050656 (4 pages).

* cited by examiner

TIRE COMPRISING A TREAD HAVING GROOVES WITH UNDERCUT SIDE FACES AND REINFORCING ELEMENTS

FIELD OF THE INVENTION

The present invention relates to tyres, and more particularly to a tyre with improved grip performance.

Generally, a tyre is an object with a cylindrical geometry relative to an axis of rotation. A tyre comprises two beads for mounting on a rim; it also comprises two sidewalls connected to the beads, and a crown including a tread for entering into contact with the ground, the crown having a first side connected to the radially outer end of one of the two sidewalls and having a second side connected to the radially outer end of the other of the two sidewalls.

The structure of the tyre is usually described by a representation of its components in a meridian plane, i.e. a plane containing the axis of rotation of the tyre. The radial, axial and circumferential directions respectively denote the directions perpendicular to the axis of rotation of the tyre, parallel to the axis of rotation of the tyre and perpendicular to any meridian plane. In the following, the expressions "radially", "axially" and "circumferentially" respectively mean "in a radial direction", "in the axial direction" and "in a circumferential direction" of the tyre. The expressions "radially inner, respectively radially outer" mean "closer to, respectively further from, the axis of rotation of the tyre, in a radial direction". The equatorial plane is a plane perpendicular to the axis of rotation of the tyre, positioned axially so as to intersect the surface of the tread substantially halfway between the beads. The expressions "axially inner, respectively axially outer" mean "closer to, respectively further from, the equatorial plane of the tyre, in the axial direction".

PRIOR ART

In a known manner, the tread of a tyre is provided with a tread design comprising in particular tread blocks delimited by various main longitudinal or circumferential, axial or oblique grooves, the individual blocks also being able to include various narrower incisions or knife cuts. The grooves form channels for draining water when travelling over wet ground; the walls of these grooves also define the edges of the tread blocks.

To improve the grip of a tyre, it is beneficial to use low-rigidity tread rubber mixtures, so as to improve the contact rate between the rubber mixture and the carriageway. This type of design applies very conventionally to competition tyres, which have shallow tread designs and a very small volume of wear rubber mixture. However, for passenger vehicle tyres, the tread depth must be sufficient to ensure satisfactory mileage and the tread design must include enough grooves to drain water when travelling over wet ground. It has always been difficult to use low-rigidity rubber mixtures for passenger vehicle tyres. The presence of a tread design, i.e. grooves designed so that they are suitable for enabling travel over wet ground in satisfactory safety conditions, makes the tread very flexible, which compromises the road holding of the vehicle on bends as the tyre does not develop sufficient thrust in the axial direction when turning.

To provide improved overall performance where low-rigidity tread rubber mixtures are used, FR3035616 and WO2016/174100 propose using a low-hardness tread rubber mixture and reinforcing the tread by including one or more circumferential reinforcements having a triangular shape when seen in meridian cross-section, the vertex of said triangle being oriented radially towards the outside. WO2016/202703 proposes increasing the rigidity of the crown by adding a layer of rubber mixture with an MA10 modulus greater than 10 MPa.

In another context, WO2015/036175 proposes a tread design for the tread of a tyre some of the grooves of which have an undercut configuration, i.e. have an axial width that increases travelling radially towards the inside; the objective of such tread designs is to retain, when the tyre is worn, an excellent ability of the tread design to drain water in the contact area between the tyre and the road when travelling on a waterlogged road. Unfortunately, this type of tread design results in a loss of drift rigidity and lateral rigidity. WO2012/069603 discloses a tyre with a layer of low-hysteresis rubber mixture between the tread and the crown reinforcement. This layer has a larger volume on the inner side of the tyre relative to the outer side.

BRIEF DESCRIPTION OF THE INVENTION

The invention relates to a tyre comprising a tread having a contact surface for coming into contact with the carriageway when the tyre is rolling, said tread comprising at least one circumferential reinforcing element, at least a portion of the meridian cross-section of which is in the shape of a triangle, the vertex of which is oriented radially towards the outside, said circumferential reinforcing element consisting of a rubber mixture with a dynamic shear modulus $G^*$ greater than the dynamic shear modulus $G^*$ of the main rubber mixture of the tread, said tread comprising at least two grooves extending at least partially circumferentially, each circumferential groove being delimited by a groove bottom and axially by two side faces, said tread comprising at least one tread block formed between two grooves, said block having an axial width measured at a radial level corresponding substantially to the groove bottom, characterized in that:

at least one of the side faces is undercut,
the circumferential reinforcing element is arranged axially relative to said undercut side face at a distance "d" of between 0 and 15% of the axial width of the tread block, at least extending radially from the inside towards the outside from a radial level situated above the wear limit level and to a radial height equal to 5% of the thickness "p" of the tread.

When grooves having undercuts are used, with the advantage known per se of improved retention of the ability to drain water despite the wear of the tyre, it is known that this has the drawback of resulting in a reduction in transverse rigidity of the tread, and therefore sub-optimal performance in terms of the dynamic behavior of the tyre. One advantage of the invention is that it makes it possible to compensate very well for the reduction in rigidity due to the undercut or undercuts, making it possible to offer performance that is both improved and much more durable over time, i.e. as the tyre becomes worn. Preferably, in order to increase the axial rigidity of the tyre sufficiently, the circumferential reinforcing element consists of a rubber mixture with a dynamic shear modulus $G^*$ at least two times greater than the dynamic shear modulus $G^*$ of the main rubber mixture of the tread.

Advantageously, the teachings of the invention are applied to a tyre in which the two side faces of all of the grooves are undercut. Preferably, the circumferential reinforcing element forms said axially undercut side face. In a preferred embodiment of the invention, the tyre includes a circumferential reinforcing element on either side of at least one groove. In this last case, it appears beneficial for said reinforcing elements to be axially connected by a strip formed from the same rubber mixture as the rubber mixture forming said circumferential reinforcing elements. It must also be noted that, in a particular embodiment of the invention, when the tyre is new, the circumferential reinforcing element is flush with the contact face of the tread for coming into contact with the carriageway when the tyre is rolling. However, if a reinforcing element forms an undercut side face, it is advantageous that, when the tyre is new, the circumferential reinforcing element is not flush with the contact face of the tread for coming into contact with the carriageway when the tyre is rolling.

Preferably, the rubber mixture forming the reinforcing element has a dynamic shear modulus G* (measured at 60° C. at 10 Hz and under an alternating shear stress of 0.7 MPa) greater than 5 MPa and preferably greater than 10 MPa.

The invention relates more particularly to tyres intended for vehicles of the passenger, SUV (Sport Utility Vehicle), two-wheeled (particularly motorcycles), or aircraft type, or industrial vehicles selected from vans, heavy-duty commercial vehicles (i.e. metro trucks, buses, heavy road transport vehicles such as trucks, tractors, and their trailers), off-road vehicles such as agricultural or earthmoving equipment, or handling equipment.

DESCRIPTION OF THE FIGURES

The objects of the invention will now be described with reference to the attached drawing, in which.

DETAILED DESCRIPTION OF THE INVENTION

Figure 1:
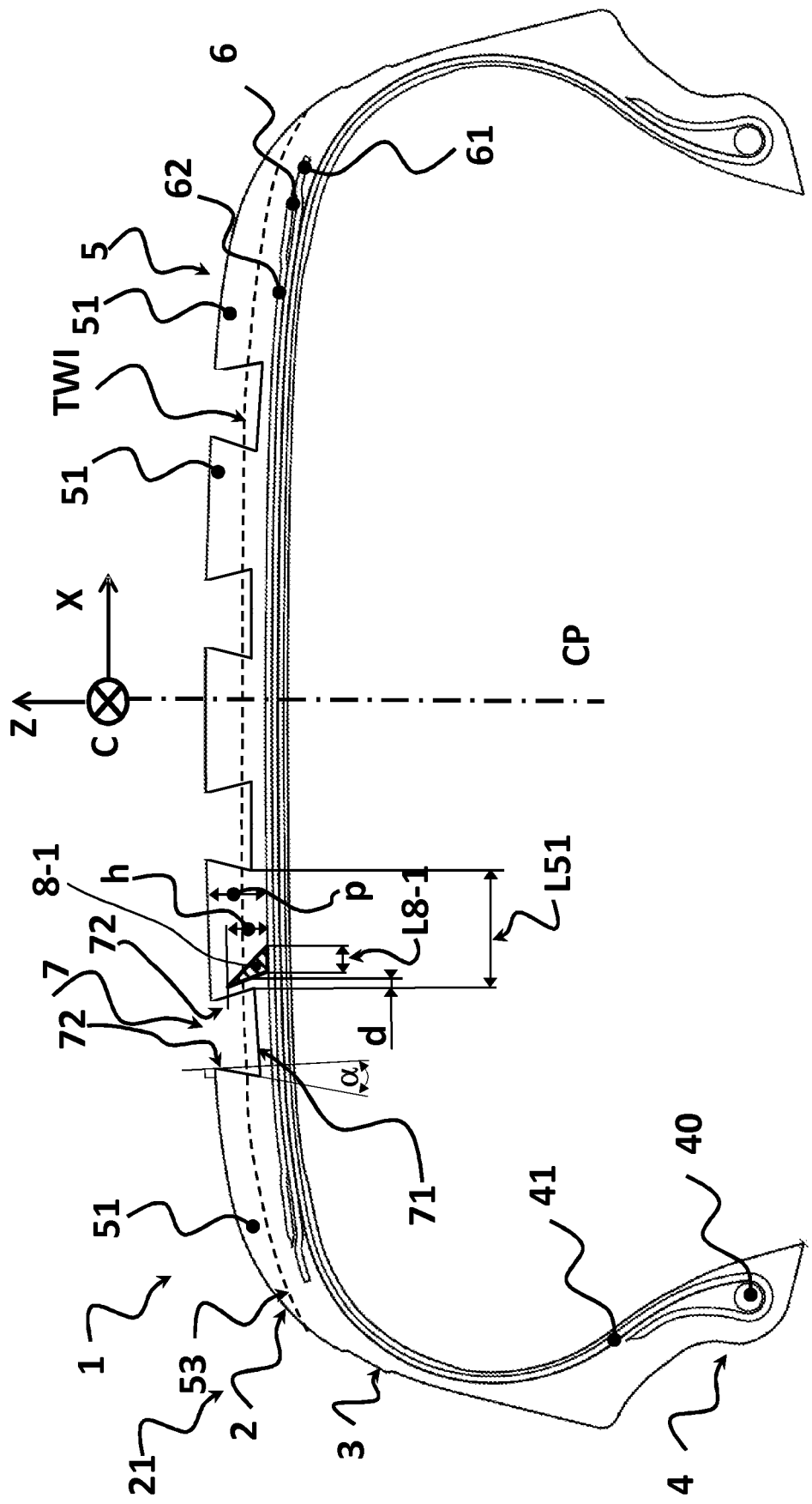
FIG. 1 is a very schematic representation of a meridian cross-section of a tyre according to a first embodiment of the invention.

FIG. 1 shows a tyre 1 comprising a crown 2 and two sidewalls 3 each connected to a bead 4. The crown 2 is connected on each side to the radially outer end of each of the two sidewalls. The crown 2 includes a tread 5. FIG. 1 shows an equatorial plane CP that is perpendicular to the axis of rotation of the tyre, situated halfway between the two beads 4 (mounted on the rim), and passing through the middle of the belt reinforcement; FIG. 1 also shows, by means of arrows arranged just above the tread 5, on the equatorial plane CP, the axial X, circumferential C and radial Z directions.

Each bead includes a bead wire 40. A carcass ply 41 is wound around each bead wire 40. The carcass ply 41 is radial and, in a manner known per se, consists of cords; in this implementation, these are textile cords; these cords are arranged substantially parallel to each other and extending from one bead to the other so that they form an angle of between 80° and 90° with the equatorial plane CP.

The tread 5 comprises a plurality of tread blocks 51. Two tread blocks are axially separated by a groove 7 extending at least partially circumferentially, each circumferential groove 7 being delimited, radially towards the inside, by a groove bottom 71, and axially by two side faces 72. At least some of said tread blocks 51 include at least one circumferential reinforcing element, generally denoted by the reference sign "8", followed by a suffix, to identify the different embodiments; thus, in FIG. 1, a circumferential reinforcing element 8-1 can be seen. In FIG. 1, there is a single circumferential reinforcing element 8-1 in a single tread block 51.

The two side faces 72 of each of the grooves 7 are undercut. The meaning of "undercut" in the context of the present invention must be specified. Let $\alpha$ be the angle formed by the side face of a groove oriented essentially circumferentially relative to the direction perpendicular to the rolling surface. A side face is said to be undercut when the angle $\alpha$ is such that, travelling radially along the direction perpendicular to the rolling surface, from the outside towards the inside (i.e. towards the axis of rotation of the tyre), said side face moves away from said perpendicular direction on the side axially opposite the groove (i.e. the rubber mixture of the tread is never cut).

The crown 2 includes a crown reinforcement 6 including two belt plies 61, 62; the carcass ply 41 is also present in the crown. Very conventionally, the belt plies 61, 62 are formed by metal cords arranged parallel to each other. In a well-known manner, the reinforcing elements formed by the cords of the carcass ply 41 and the cords of the belt plies 61, 62 are oriented in at least three different directions so as to form a triangulation.

By convention, the axial width L51 of the tread block 51 is measured at the radial level corresponding to the bottom 71 of the groove 7. The wear limit is identified by the dashed line TWI. By convention, the thickness "p" of the tread, measured when the tyre is in new condition, between the contact surface for coming into contact with the carriageway when the tyre is rolling and the radially outer edge of the radially outermost belt ply 62, is taken as the reference. Advantageously, the dynamic shear modulus G* of the rubber mixture appearing on the surface of the bottom 71 of the groove 7 is identical to the dynamic shear modulus G* of the main rubber mixture of the tread. The circumferential reinforcing element 8-1 is arranged axially relative to said undercut side face 72 at a distance "d" equal to approximately 10% of the axial width L51 of the tread block 51. This distance "d" is substantially constant extending radially from the inside towards the outside over the entyre radial height "h" of the circumferential reinforcing element 8-1. This radial height "h" of the circumferential reinforcing element 8-1 reaches approximately 75% of the thickness "p" of the tread. The circumferential reinforcing element 8-1 is not flush with the contact face of the tread for coming into contact with the carriageway when the tyre is rolling. It must also be noted that, at its base, the axial width L8-1 of the circumferential reinforcing element 8-1 is equal to approximately 20% of the axial width L51 of the tread block 51.

The reader can refer to table 1 (paragraph 77) of the aforementioned patent application WO2016/174100 to find a rubber composition cited for the reinforcing element, having a dynamic shear modulus G* (measured at 60° C. at 10 Hz and under an alternating shear stress of 0.7 MPa) equal to 30.3 MPa. There is no restriction or limitation regarding the main material for the tread, the present invention being compatible with any rigidity and/or loss factor value. In a particular, non-limitative embodiment, the invention can be used with a main material for the tread with a very low-rigidity rubber composition in order to achieve very high grip levels, for sport vehicle applications. The reader can refer to table 2 (paragraph 88) of the aforementioned patent application WO2016/174100 to find a rubber composition cited for the main material for the tread, having a dynamic shear modulus G* equal to 0.9 MPa.

The description below illustrates variant embodiments of the invention with reference to FIGS. 2 to 14. In the figures, all of the common elements have the same reference signs; in the description below, only what is specific to the example illustrated is described, without repeating aspects already disclosed in the description of the successive figures.

Figure 2:
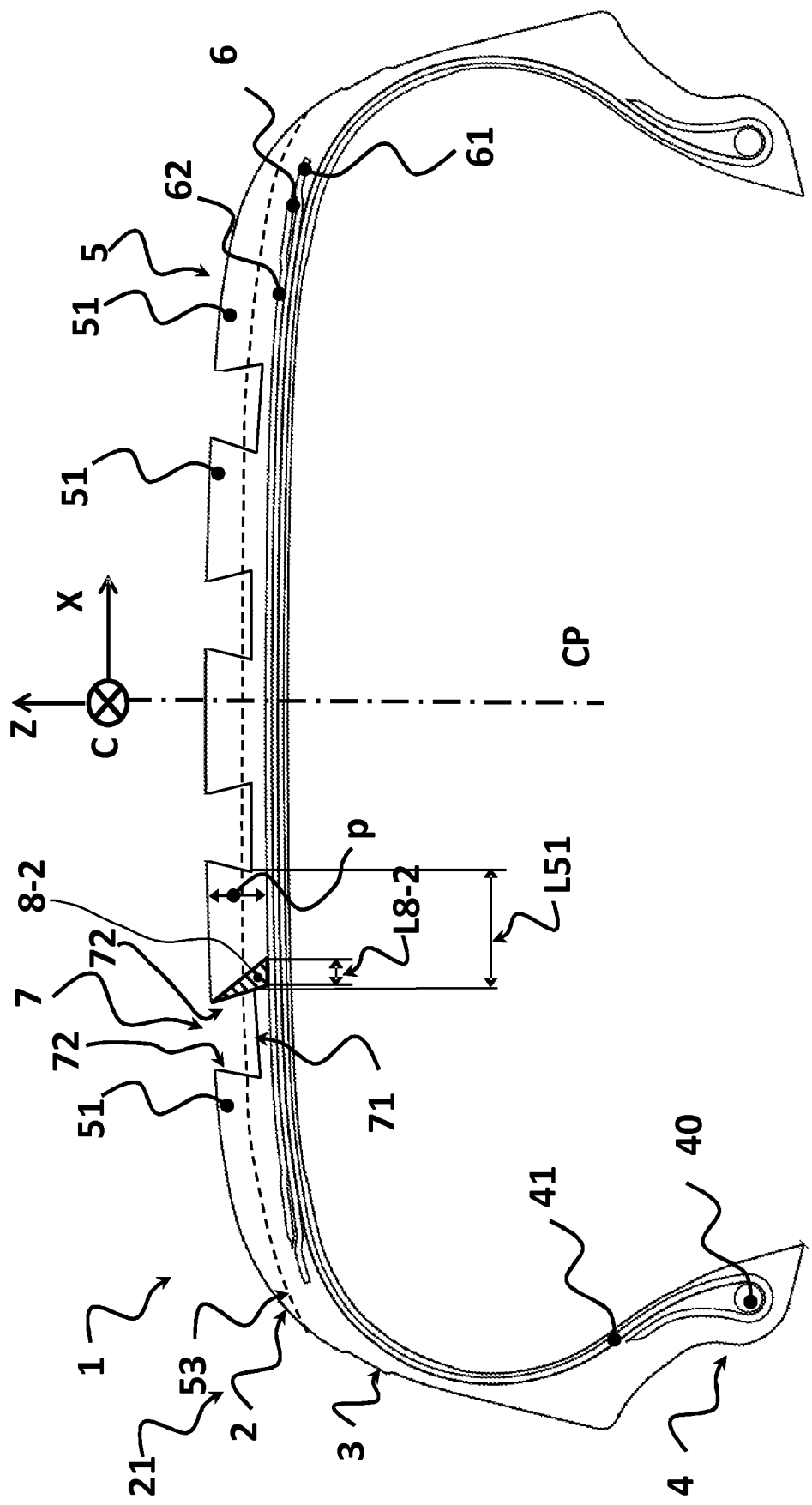
FIG. 2 is a very schematic representation of a meridian cross-section of a tyre according to a second embodiment of the invention.

FIG. 2 shows that the circumferential reinforcing element 8-2 is flush with the contact face of the tread for coming into contact with the carriageway when the tyre is rolling, and that the circumferential reinforcing element 8-2 forms one of the side faces 72 of a circumferential groove 7. These two aspects can be used independently of each other. In this example, the distance "d" is zero and the radial height "h" of the circumferential reinforcing element 8-2 is identical to the thickness "p" of the tread. At its base, the axial width L8-2 of the circumferential reinforcing element 8-2 is equal to approximately 25% of the axial width L51 of the tread block.

Figure 3:
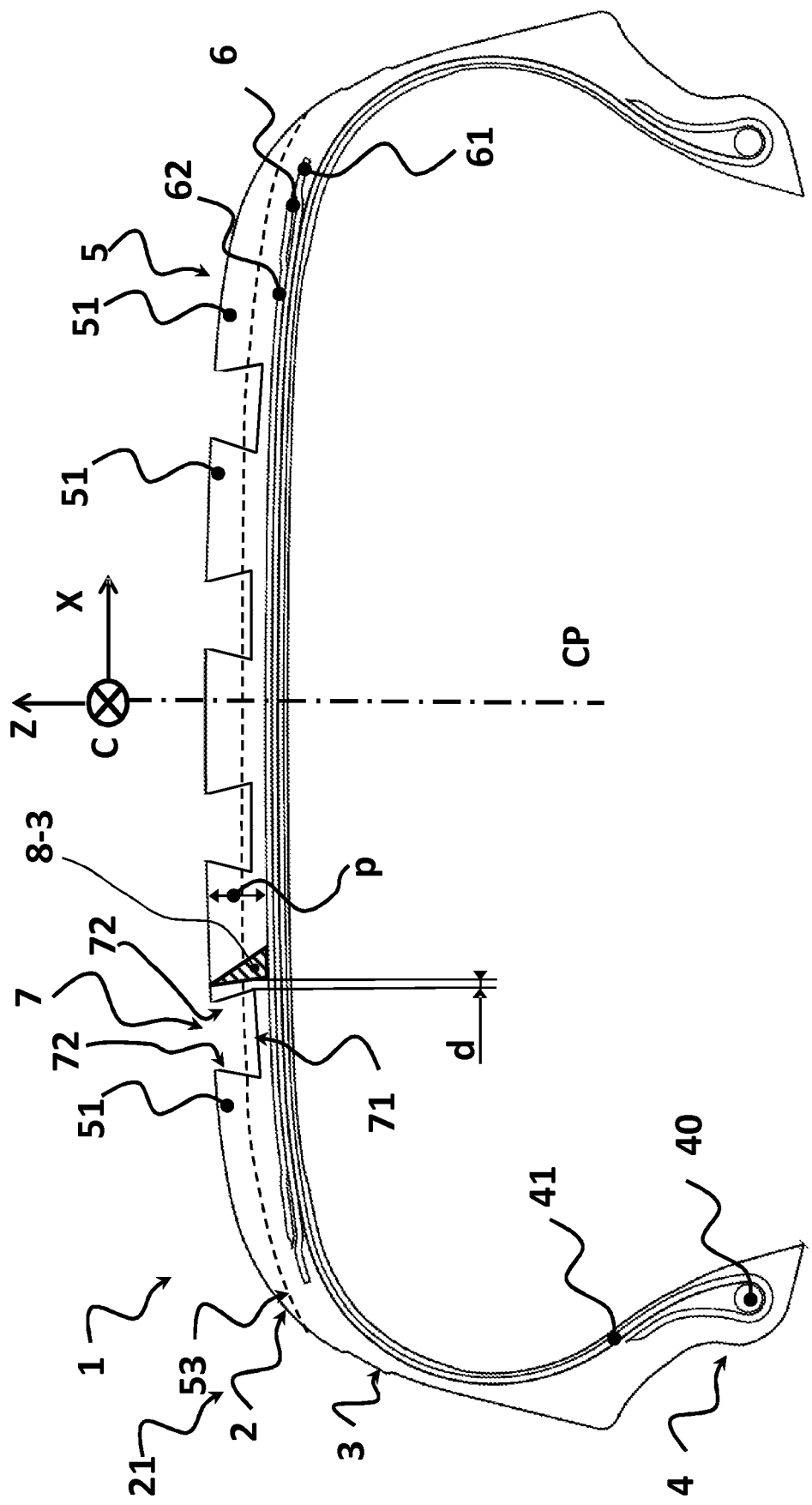
FIG. 3 is a very schematic representation of a meridian cross-section of a tyre according to a third embodiment of the invention.

In FIG. 3, the circumferential reinforcing element 8-3 is not positioned on the edge of a tread block 51; the distance "d" is equal to approximately 5% of the axial width L51 of the tread block; when the distance "d" is non-zero, a maximum value of said distance "d" is preferably in the region of 2 mm.

Figure 4:
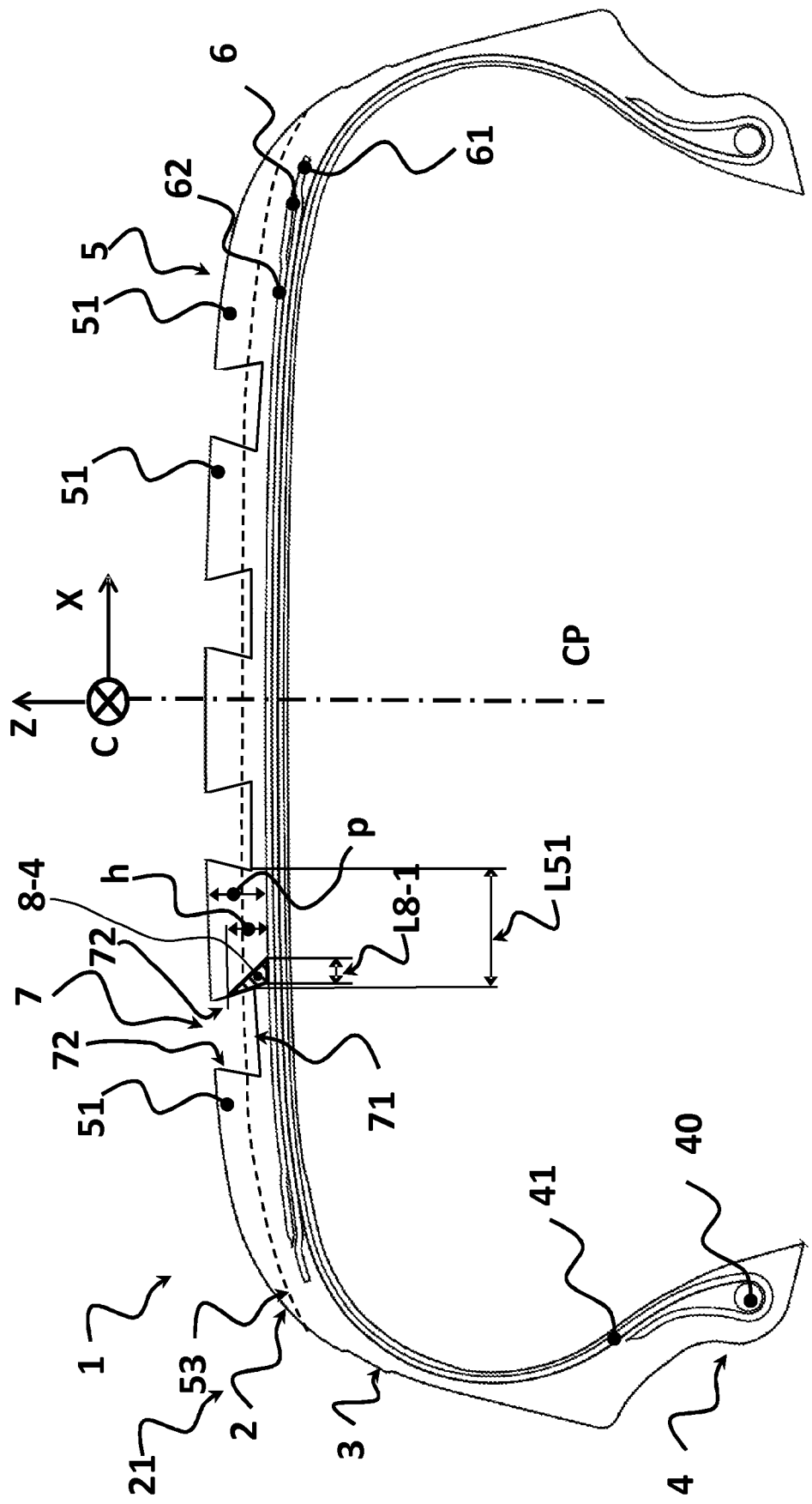
FIG. 4 is a very schematic representation of a meridian cross-section of a tyre according to a fourth embodiment of the invention.

FIG. 4 shows that the circumferential reinforcing element 8-4 is not flush with the contact face of the tread for coming into contact with the carriageway when the tyre is rolling, and that the circumferential reinforcing element 8-4 forms one of the side faces 72 of a circumferential groove 7.

Figure 5:
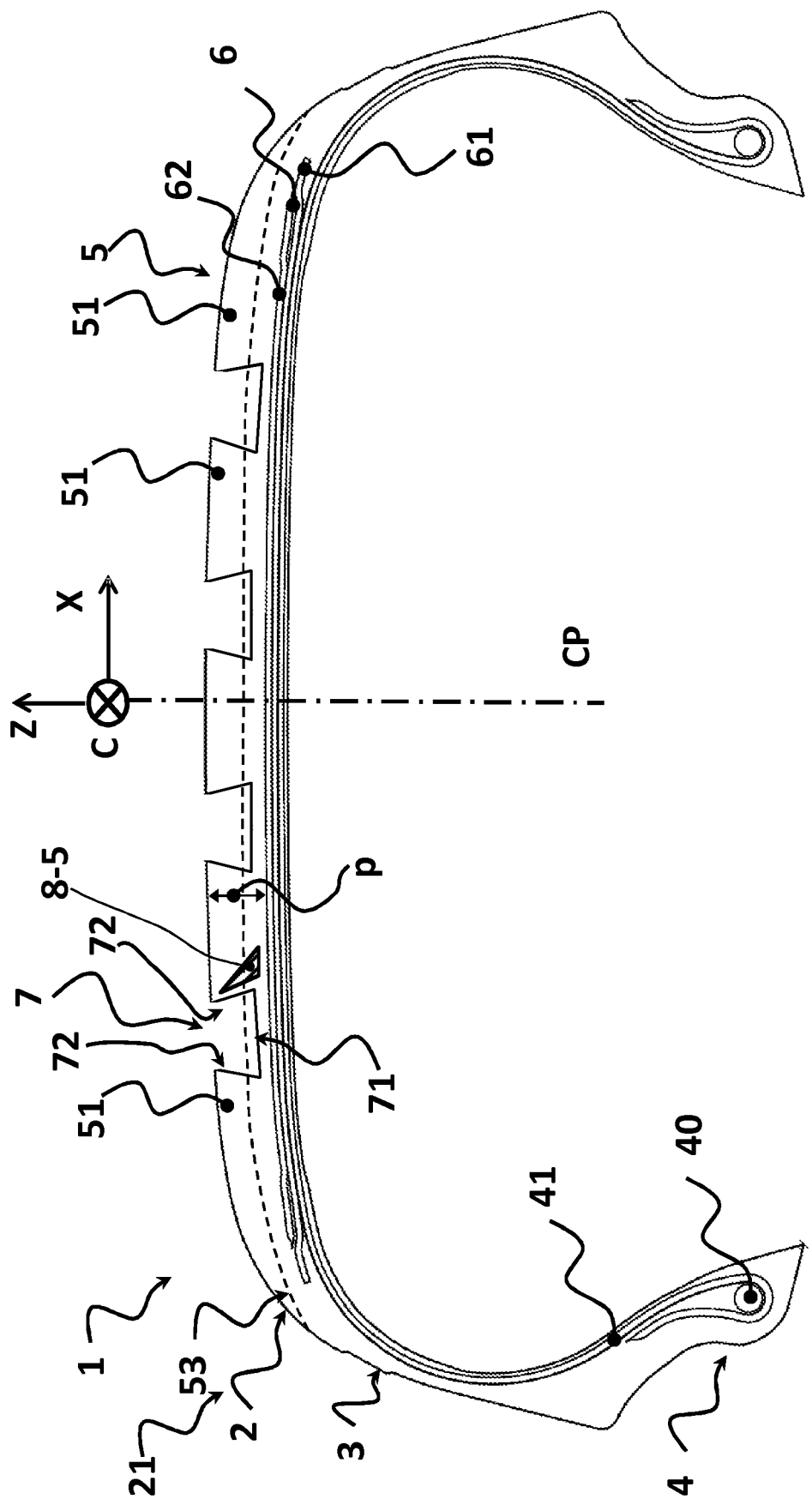
FIG. 5 is a very schematic representation of a meridian cross-section of a tyre according to a fifth embodiment of the invention.

FIG. 5 shows that the circumferential reinforcing element 8-5 rests radially on the main material for the tread and is radially spaced apart from the crown reinforcement 6. The distance between the crown reinforcement and the reinforcer is preferably less than 2 mm, advantageously less than 1 mm.

Figure 6:
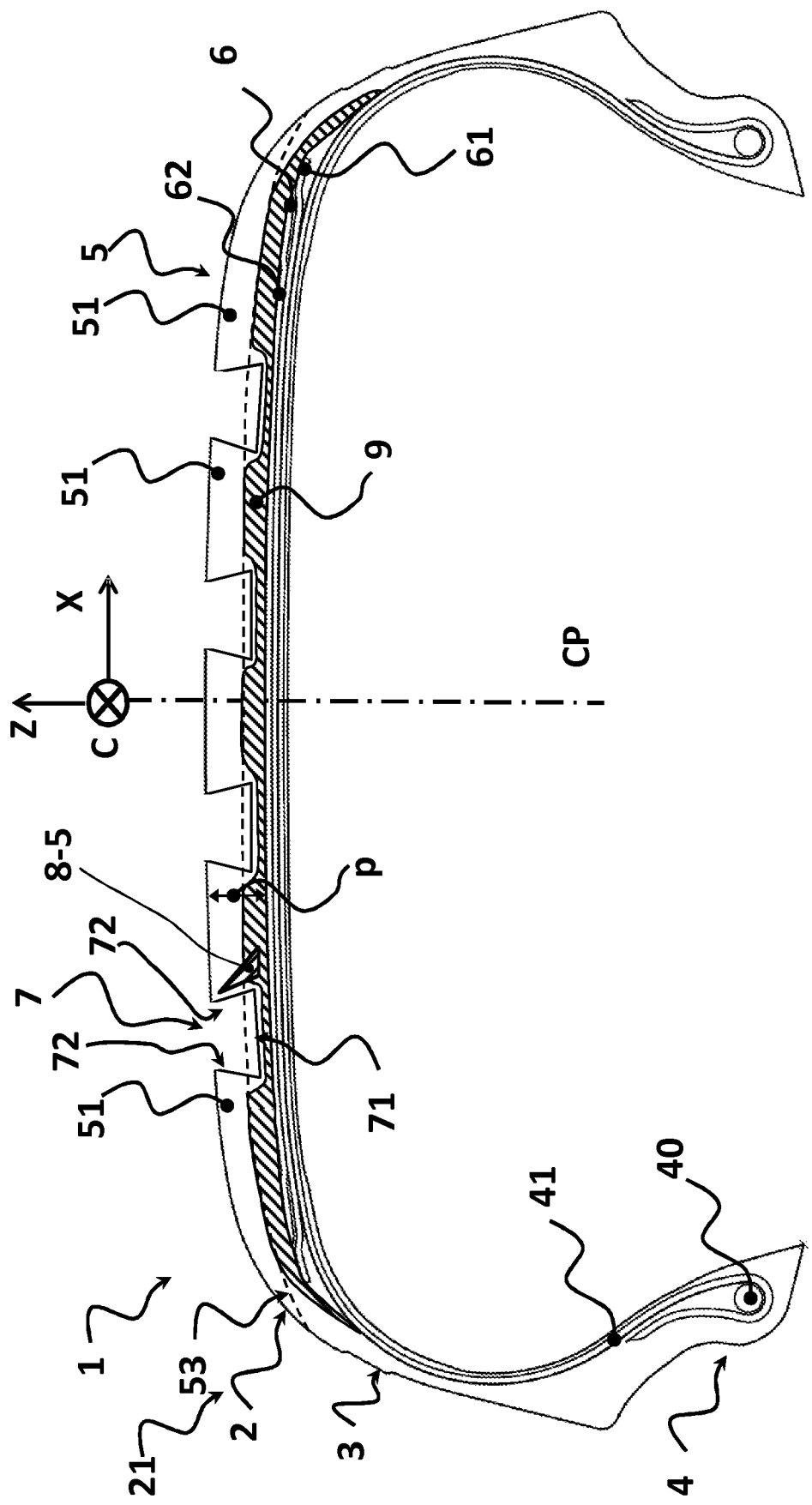
FIG. 6 is a very schematic representation of a meridian cross-section of a tyre according to a sixth embodiment of the invention.

FIG. 6 shows that the circumferential reinforcing element 8 rests on an under-layer 9. The distance between the crown reinforcement and the reinforcer is preferably less than 2 mm, advantageously less than 1 mm, while the sub-layer 9 extends radially up to the level of the tread wear limit.

Figure 7:
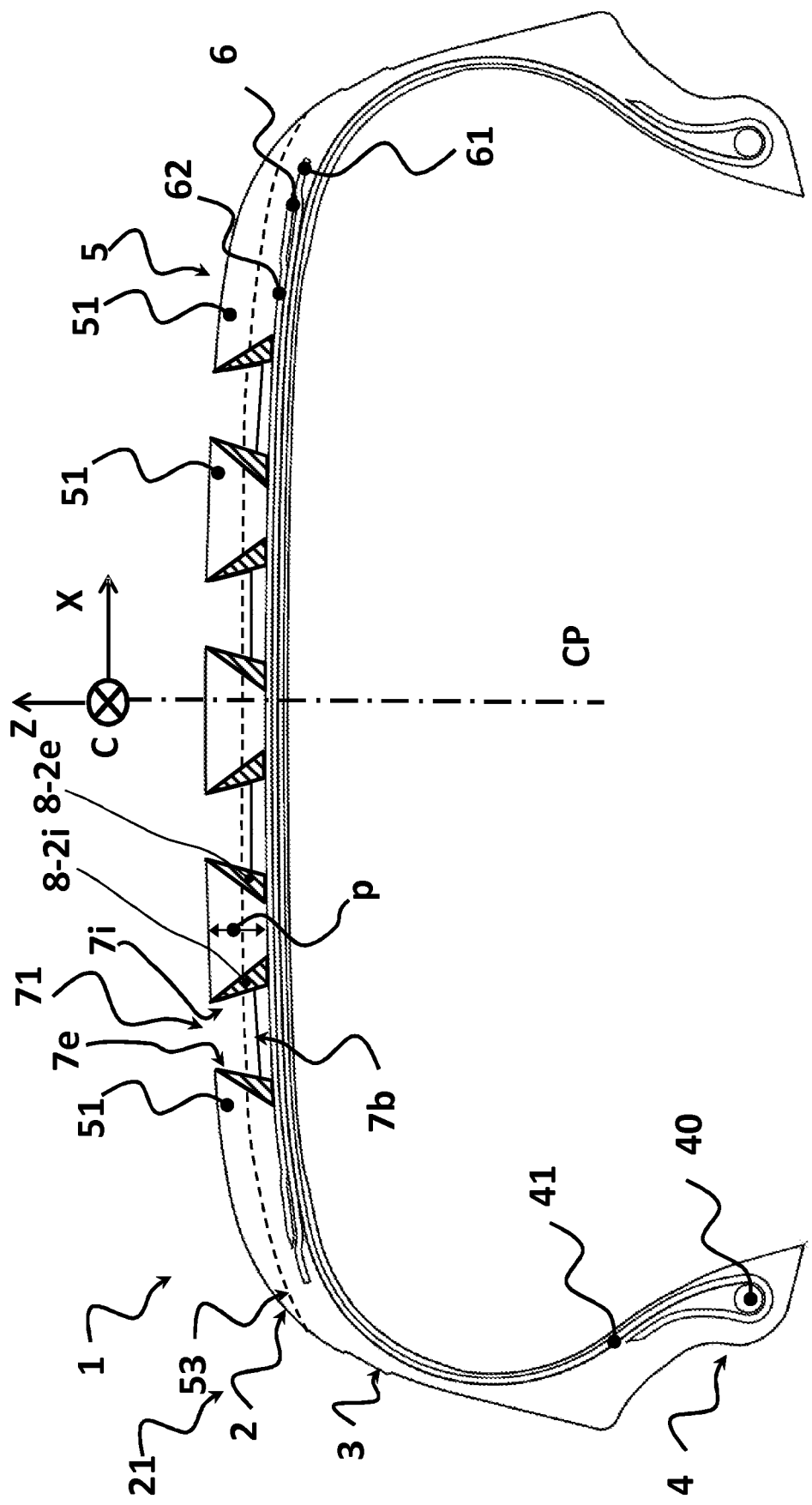
FIG. 7 is a very schematic representation of a meridian cross-section of a tyre according to a seventh embodiment of the invention.

Advantageously, all of the blocks 51 are provided with at least one circumferential reinforcing element 8-x. This can be seen in the embodiments shown in FIGS. 7 and 8. FIG. 7 shows that, as illustrated in FIG. 2, the circumferential reinforcing element 8-2i is flush with the contact face of the tread for coming into contact with the carriageway when the tyre is rolling and forms one of the side faces 7i of a circumferential groove 7. The circumferential reinforcing element 8-2e has mirror symmetry relative to the circumferential reinforcing element 8-2i; it is flush with the contact face of the tread for coming into contact with the carriageway when the tyre is rolling and forms the other 7e of the side faces of a circumferential groove 7. All of the grooves 7 are bordered by such circumferential reinforcing elements 8-2i and 8-2e.

Figure 8:
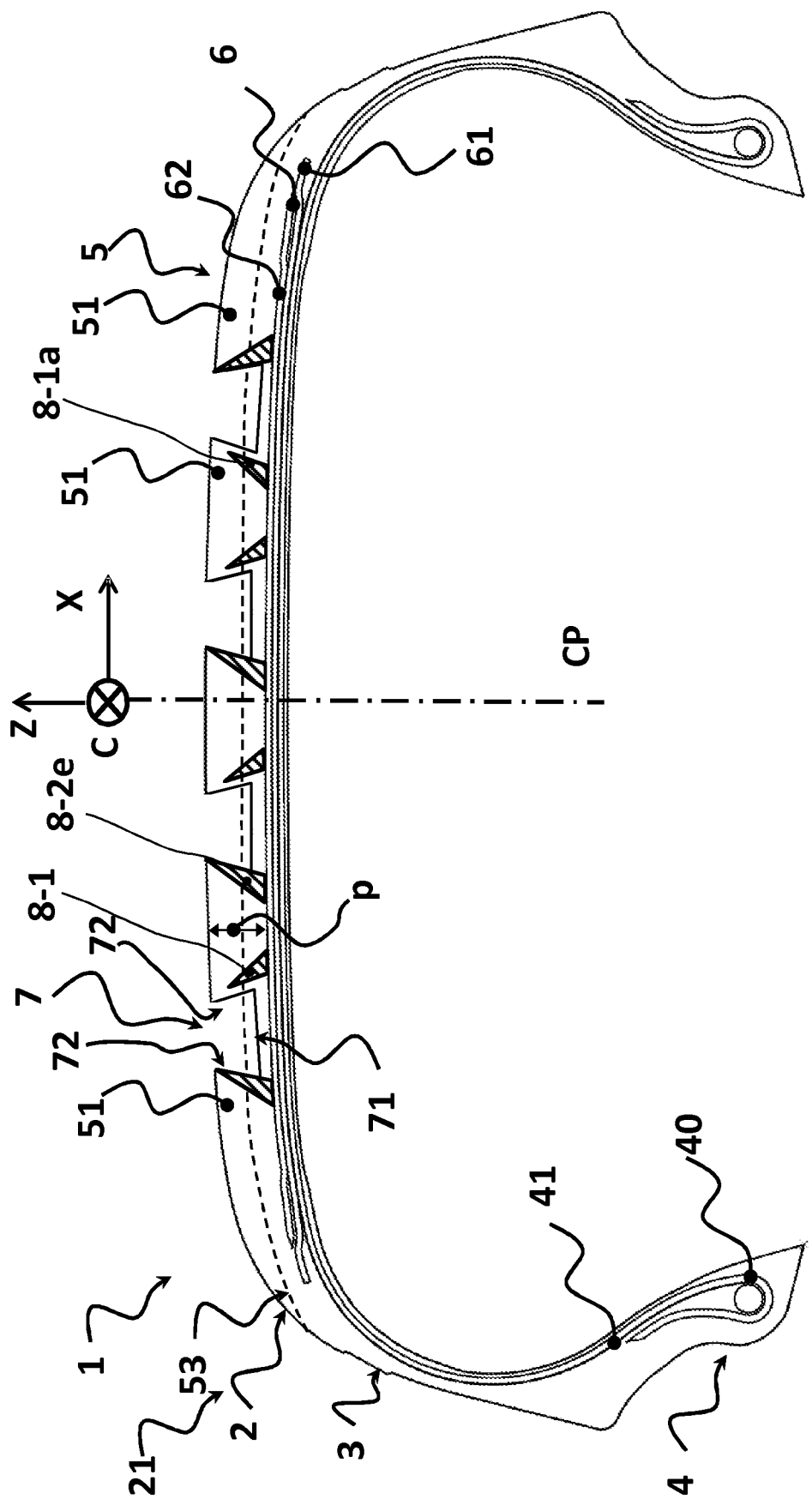
FIG. 8 is a very schematic representation of a meridian cross-section of a tyre according to an eighth embodiment of the invention.
Figure 9:
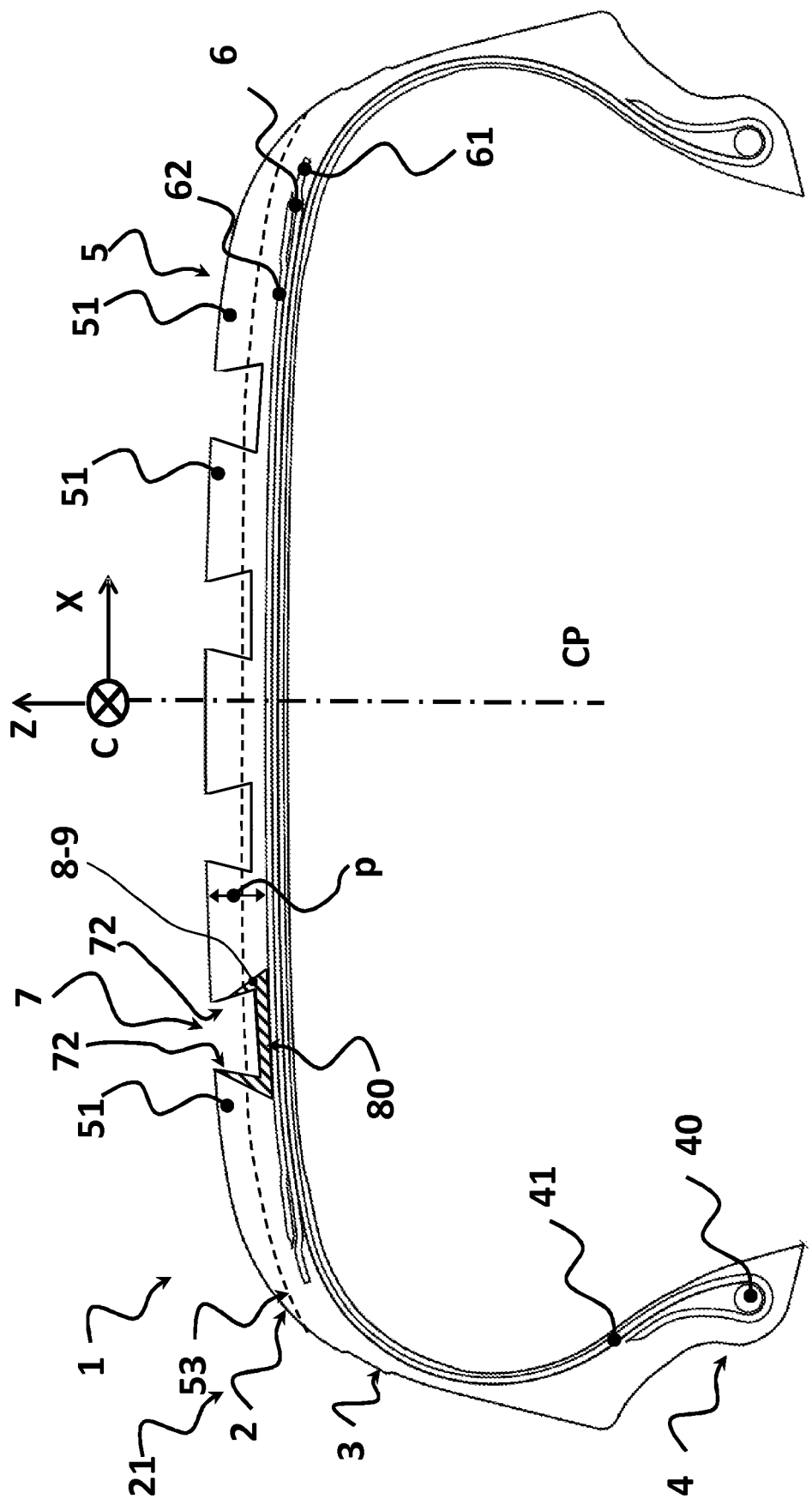
FIG. 9 is a very schematic representation of a meridian cross-section of a tyre according to a ninth embodiment of the invention.
Figure 10:
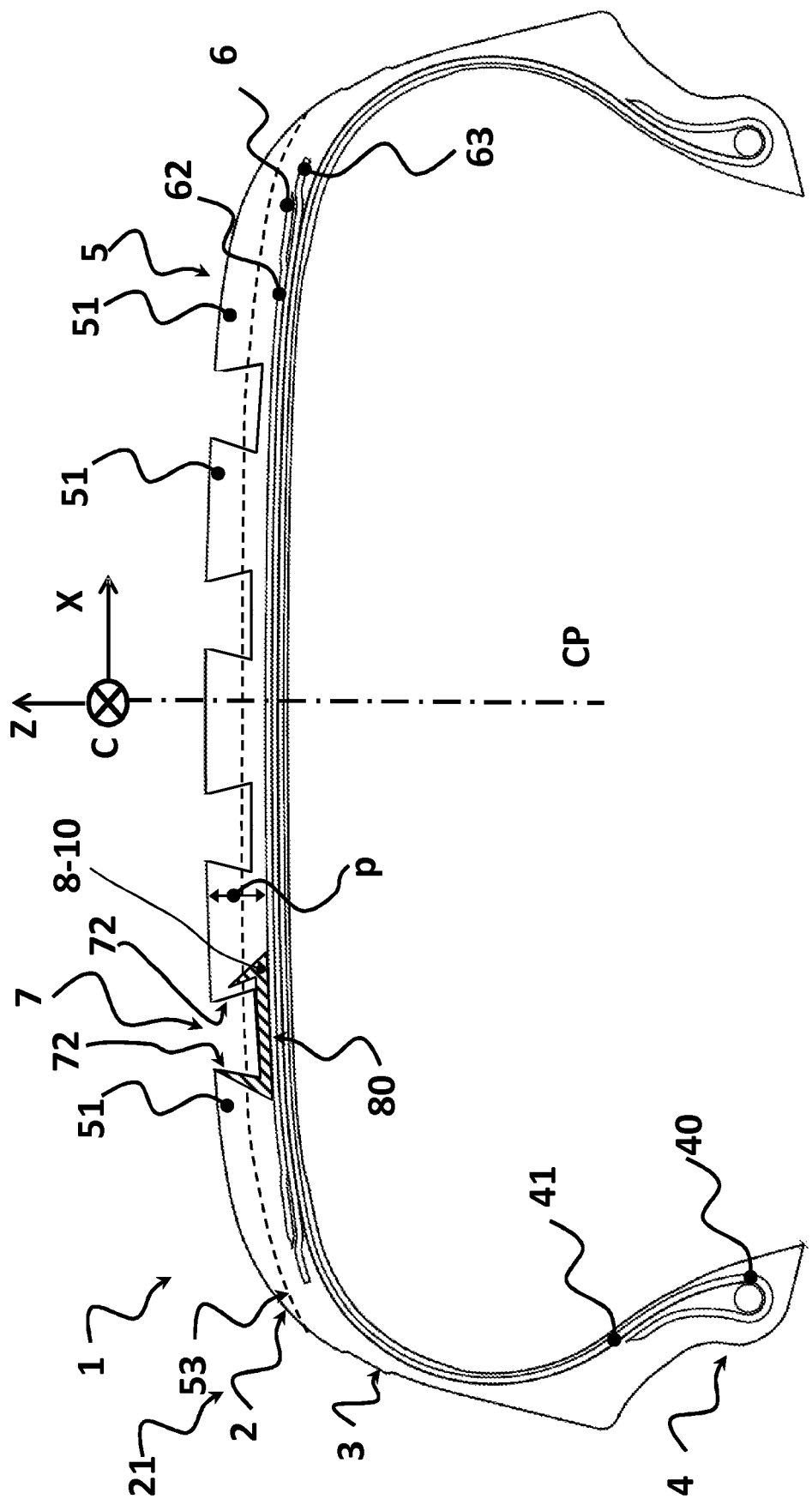
FIG. 10 is a very schematic representation of a meridian cross-section of a tyre according to a tenth embodiment of the invention.
Figure 11:
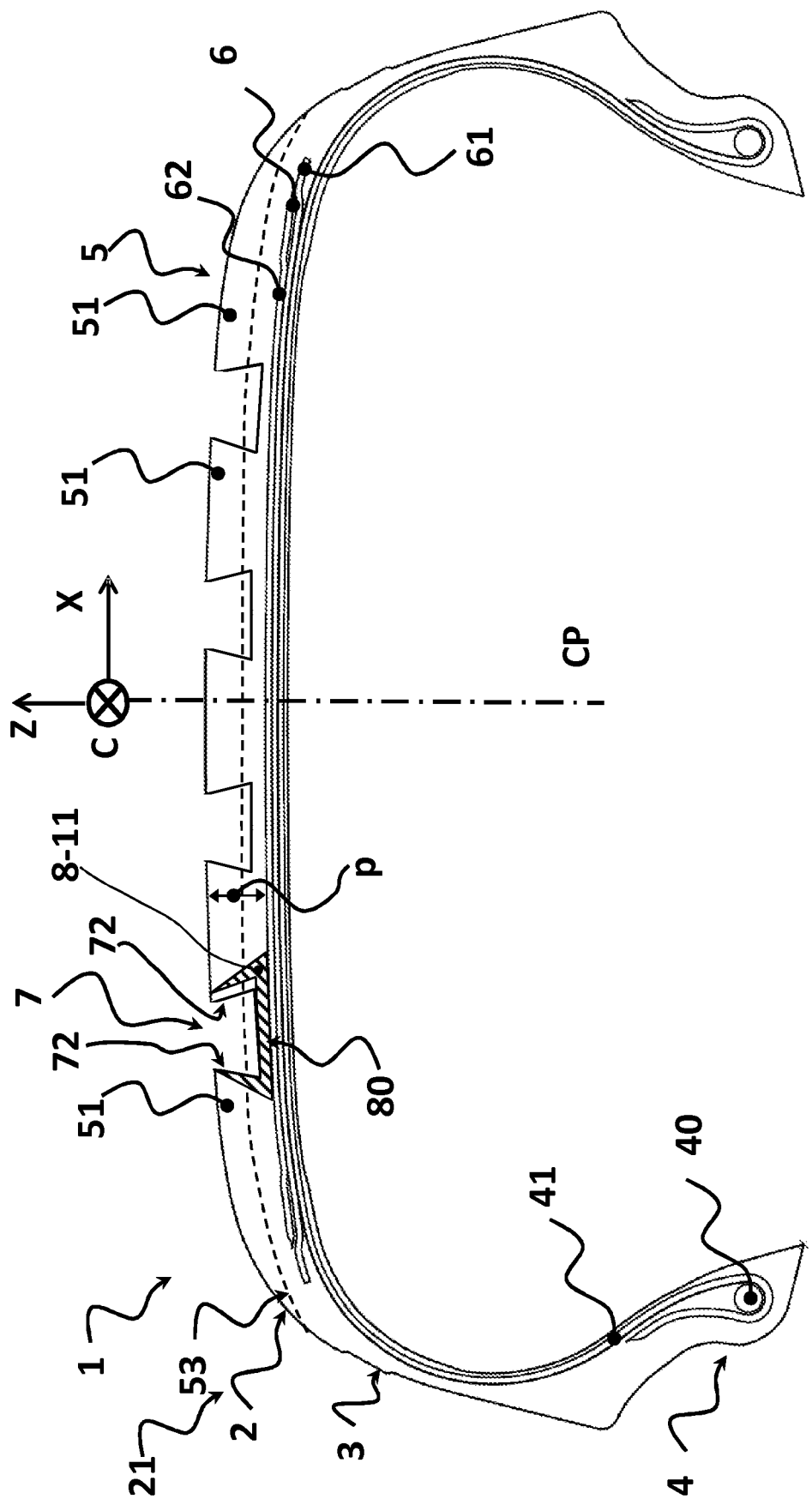
FIG. 11 is a very schematic representation of a meridian cross-section of a tyre according to an eleventh embodiment of the invention.

In FIG. 8, each groove 7 is bordered on one side by a circumferential reinforcing element 8-2e similar to the one illustrated in FIG. 7, therefore flush with the contact face of the tread for coming into contact with the carriageway when the tyre is rolling and forming one of the side faces 7e of a circumferential groove 7. On the axially opposite side of each groove is arranged a circumferential reinforcing element 8-1 with the configuration and arrangement illustrated in FIG. 1, i.e. at a non-zero distance "d" from the groove, and of a radial height less than the depth of the tread.

Figure 12:
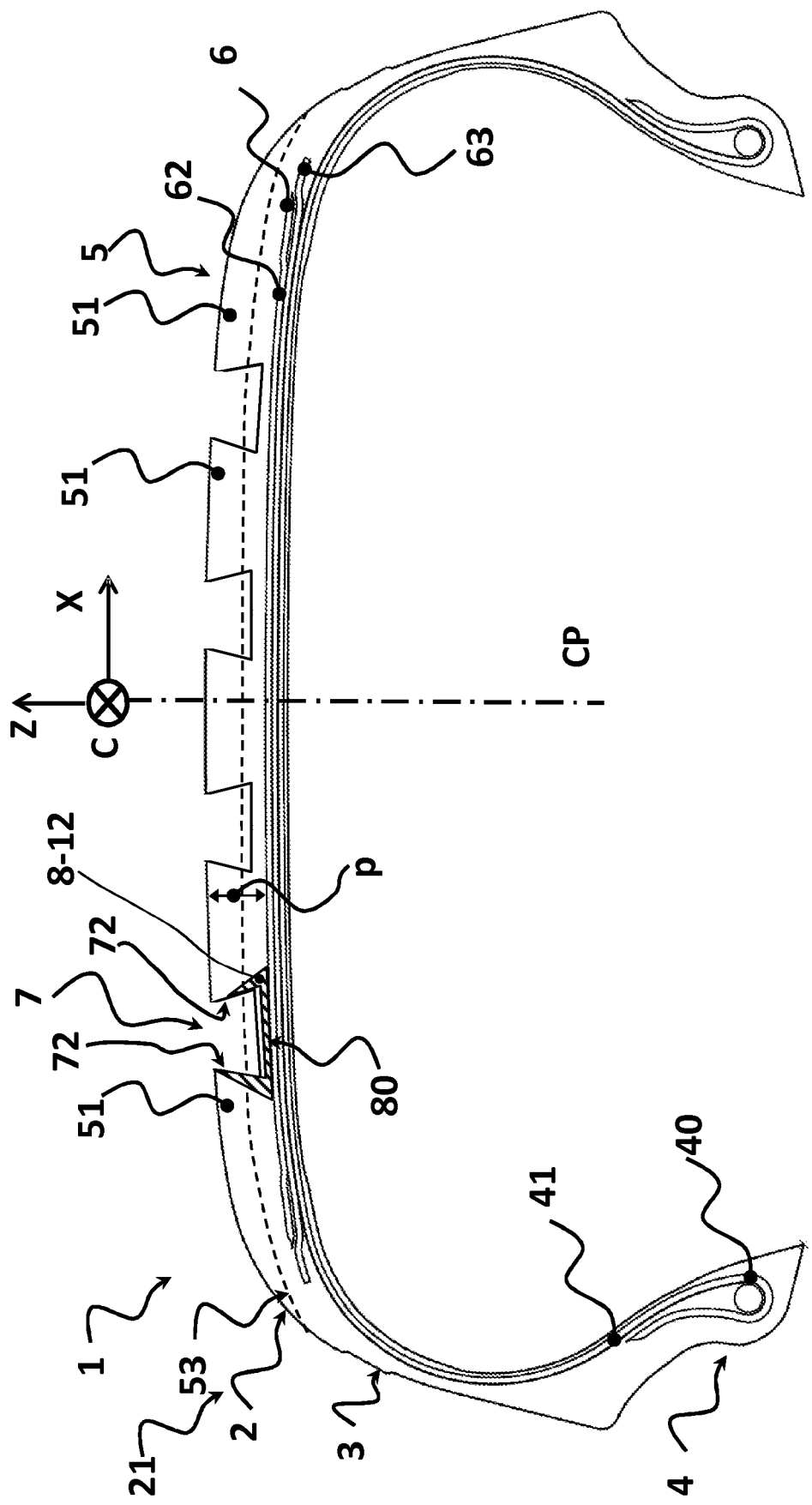
FIG. 12 is a very schematic representation of a meridian cross-section of a tyre according to a twelfth embodiment of the invention.
Figure 13:
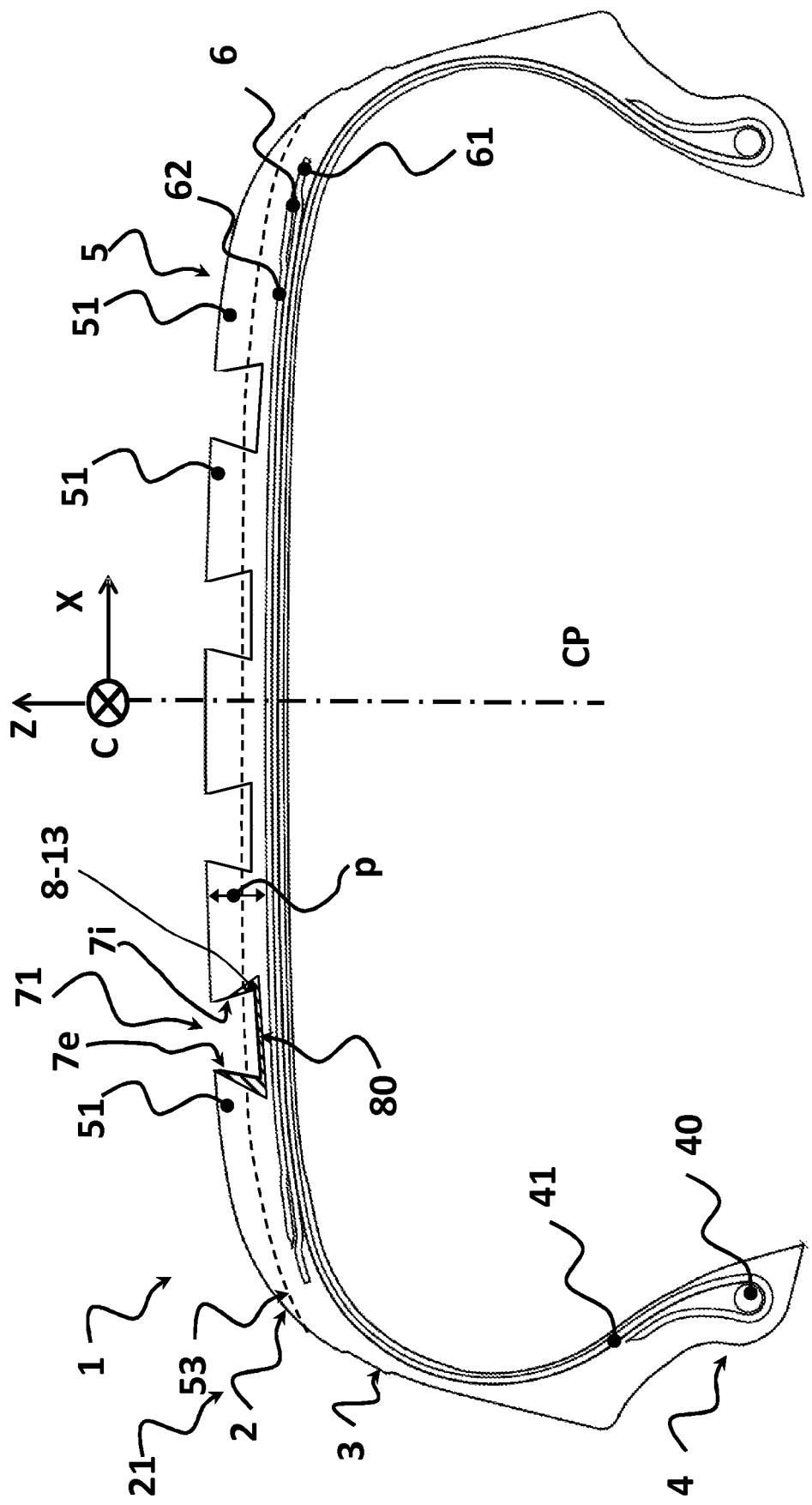
FIG. 13 is a very schematic representation of a meridian cross-section of a tyre according to a thirteenth embodiment of the invention.
Figure 14:
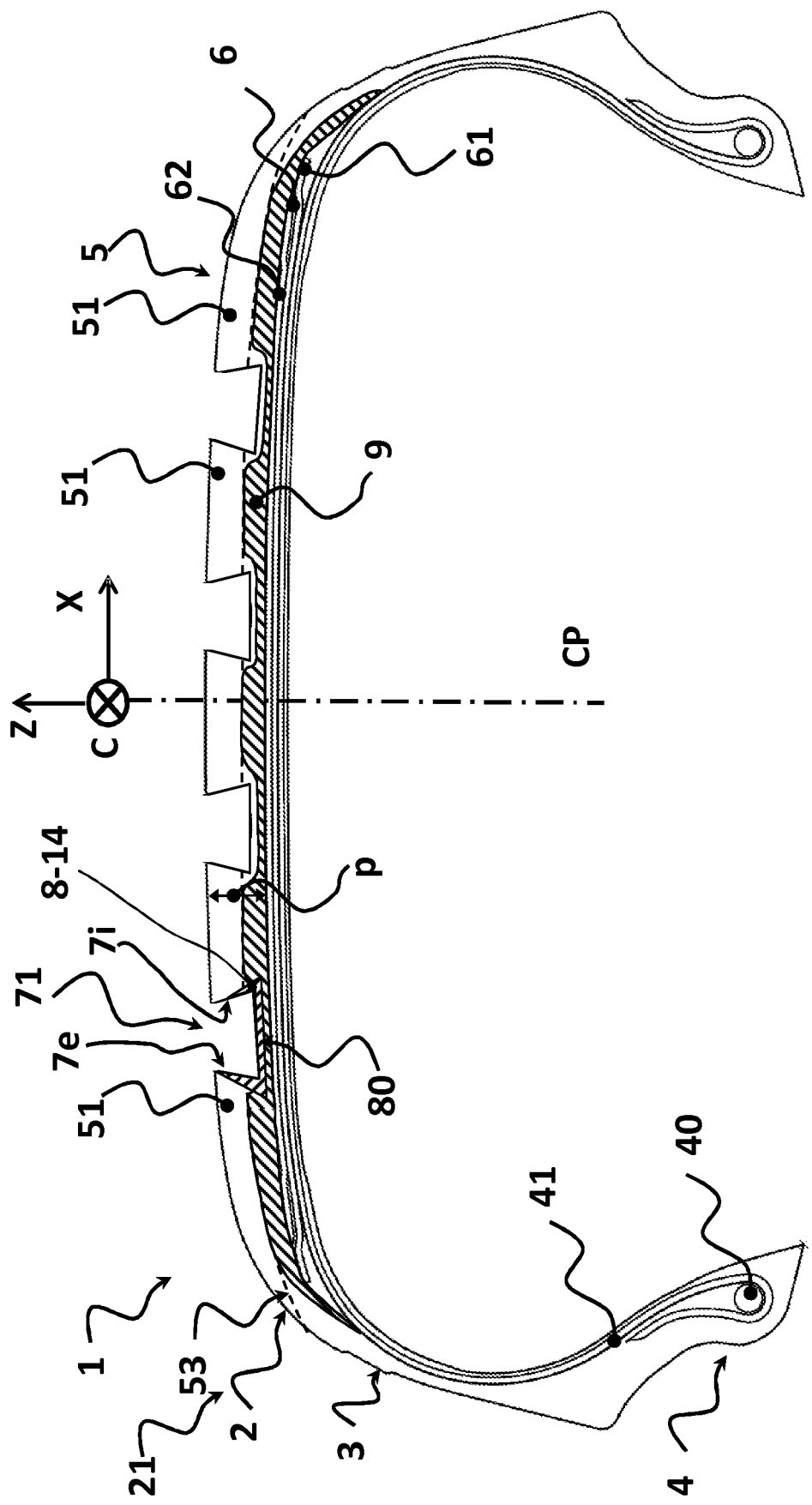
FIG. 14 is a very schematic representation of a meridian cross-section of a tyre according to a fourteenth embodiment of the invention.

FIGS. 9 to 14 give examples of reinforcing elements distributed on either side of a groove, in different forms and positions explained above; the aspect common to all of these embodiments is that the circumferential reinforcing elements 8-9, 8-10, 8-11, 8-12, 8-13, 8-14 distributed on either side of a groove are axially connected by a strip 80 formed from the same rubber mixture as the rubber mixture forming said circumferential reinforcing elements. These circumferential reinforcing elements are sometimes flush with the groove bottom (FIGS. 9 to 11), and sometimes not flush with the groove bottom (FIGS. 12 to 14).

It must also be noted that the invention can be applied equally to inflated tyres and to non-pneumatic assemblies and that numerous combinations of shapes and arrangements of reinforcing elements are possible, without departing from the scope of the present invention.

Figure 15:
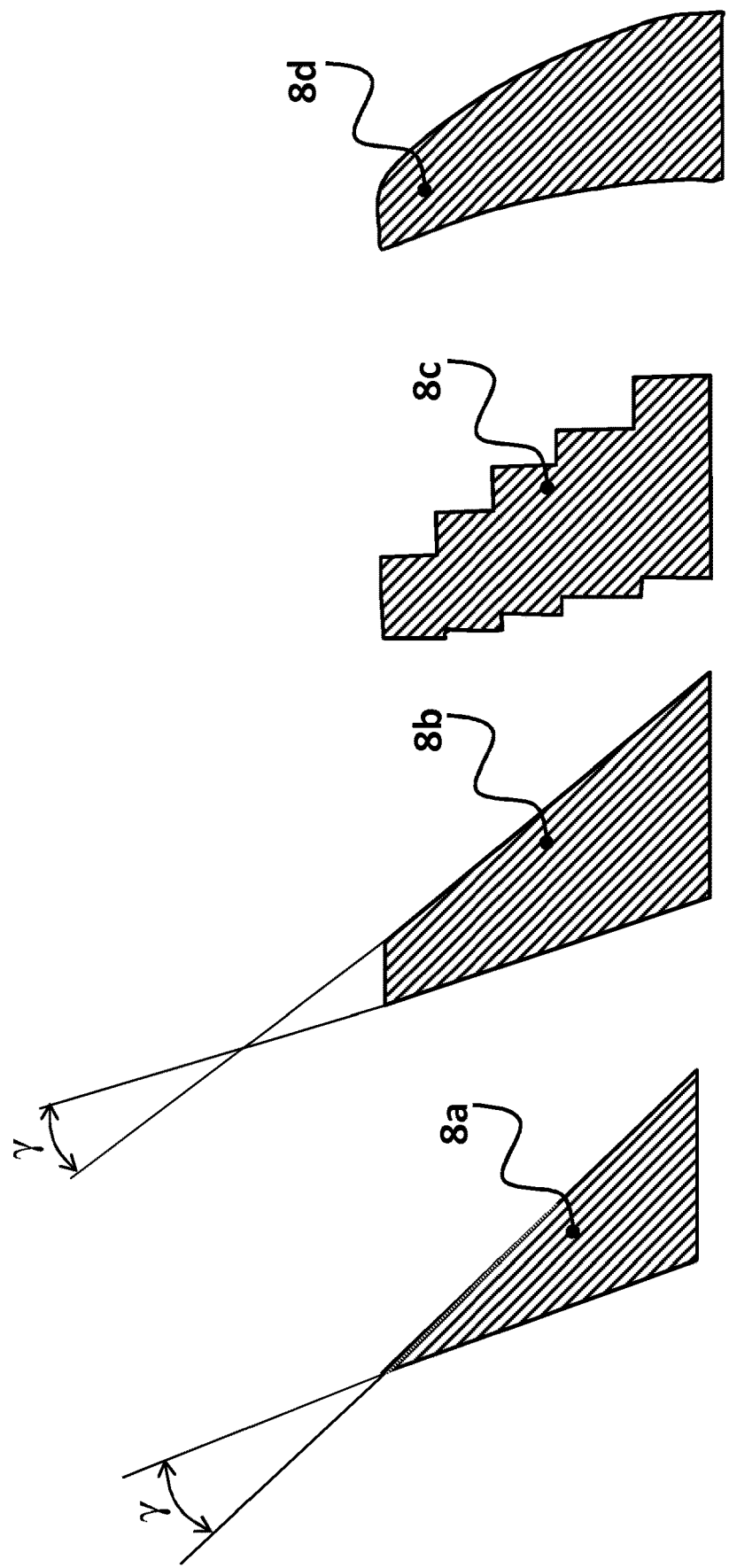
FIG. 15 very schematically shows variations of the shape of a reinforcing element that forms part of the invention.

Although the general appearance of the reinforcing element is in the shape of a triangle, seen in meridian cross-section, it must therefore be understood that a plurality of geometries (seen in meridian cross-section) meets the requirements of the present invention. This is illustrated in FIG. 15. The shape of the circumferential reinforcing elements disclosed is triangular (see 8a), but this shape can vary (8b) and one or other of the side walls can be concave (see 8d), convex (see 8d), or stepped (see 8c), particularly, without departing from the scope of the invention. The important thing is that the width of the reinforcing element, measured axially, reduces progressively travelling along the reinforcing element radially from the inside towards the outside, without excessively abrupt variation. The shape of the circumferential reinforcing element has a cross-section that is radially tapered towards the outside. This increases its effectiveness. The walls of this circumferential reinforcing element can be concave, convex or stepped. Preferably, the angle γ formed by the two side walls of the circumferential reinforcing element or elements is greater than 35°. Below 35°, the applicant's observations show that effectiveness is reduced.

The invention claimed is:

1. A tire comprising a tread having a contact surface for coming into contact with a carriageway when the tire is rolling, the tread comprising:
- at least one circumferential reinforcing element, at least a portion of a meridian cross-section of the at least one circumferential reinforcing element being in the shape of an obtuse triangle, a vertex of which is oriented radially toward the outside, and the at least one circumferential reinforcing element consisting of a rubber mixture with a dynamic shear modulus G* greater than a dynamic shear modulus G* of a main rubber mixture of the tread;
- at least two grooves extending at least partially circumferentially, each circumferential groove being delimited by a groove bottom and axially by two side faces;
- at least one tread block formed between two circumferential grooves, the at least one tread block having an axial width measured at a radial level corresponding substantially to the groove bottom, wherein at least one of the side faces is undercut, and
wherein the at least one circumferential reinforcing element is arranged axially relative to the undercut side face at a non-zero distance d of between 0 and 15% of the axial width of the at least one tread block, the non-zero distance d being substantially constant extending radially from the inside toward the outside over an entire radial height h of the at least one circumferential reinforcing element and from a radial level situated above a wear limit level and to a radial height equal to 5% of a thickness p of the tread.

2. The tire according to claim 1, wherein the at least one circumferential reinforcing element consists of a rubber mixture with a dynamic shear modulus G* at least two times greater than the dynamic shear modulus G* of the main rubber mixture of the tread.

3. The tire according to claim 1, wherein the at least one circumferential reinforcing element forms the axially undercut side face.

4. The tire according to claim 1, wherein the rubber mixture forming the at least one reinforcing element has a dynamic shear modulus G* greater than 5 MPa.

5. The tire according to claim 4, wherein the rubber mixture forming the at least one reinforcing element has a dynamic shear modulus G* greater than 10 MPa.

6. The tire according to claim 1, wherein a dynamic shear modulus G* of a rubber mixture on the surface of the groove bottom is identical to the dynamic shear modulus G* of the main rubber mixture of the tread.

7. The tire according to claim 1, wherein the at least one circumferential reinforcing element is flush with the contact surface of the tread.

8. The tire according to claim 1, wherein the at least one circumferential reinforcing element is included on either side of at least one groove.

9. The tire according to claim 8, wherein circumferential reinforcing elements are axially connected by a strip formed from the same rubber mixture as the rubber mixture forming the circumferential reinforcing elements.

* * * * *